(No Model.) 2 Sheets—Sheet 1.

W. H. SANDERSON & O. O. OZIAS.
WEIGHING AND PRICE SCALE.

No. 451,075. Patented Apr. 28, 1891.

WITNESSES:

INVENTORS
William H. Sanderson &
Orange O. Ozias,
BY
Church & Church
THEIR ATTORNEYS (No Model.) 2 Sheets—Sheet 2.

W. H. SANDERSON & O. O. OZIAS.
WEIGHING AND PRICE SCALE.

No. 451,075. Patented Apr. 28, 1891.

UNITED STATES PATENT OFFICE.

WILLIAM H. SANDERSON AND ORANGE O. OZIAS, OF DAYTON, OHIO; SAID OZIAS ASSIGNOR TO HIMSELF AND EDWARD CANBY, OF SAME PLACE.

WEIGHING AND PRICE SCALE.

SPECIFICATION forming part of Letters Patent No. 451,075, dated April 28, 1891.

Application filed January 3, 1891. Serial No. 376,624. (No model.)

*To all whom it may concern:*

Be it known that we, WILLIAM H. SANDERSON and ORANGE O. OZIAS, both of Dayton, in the county of Montgomery and State of Ohio, have invented certain new and useful Improvements in Weighing and Price Scales; and we do hereby declare the following to be a full, clear, and exact description of the same, reference being had to the accompanying drawings, forming a part of this specification, and to the letters of reference marked thereon.

This invention relates to improvements in scales which are adapted to indicate the price or the weight of goods, merchandise, &c., such as are described in the patent issued to Julius E. Pitrat, June 26, 1888, No. 385,005, and in the application filed by O. O. Ozias and Edward Canby on the 24th day of November, 1890, Serial No. 372,520; and it has for its object to improve the detail construction of such scales, whereby the same are simplified and their efficiency and the facility with which they may be handled and adjusted increased.

The invention therefore consists in certain novel details of construction and combinations and arrangements of parts to be hereinafter described, and pointed out particularly in the claims at the end of this specification.

Figure 1:
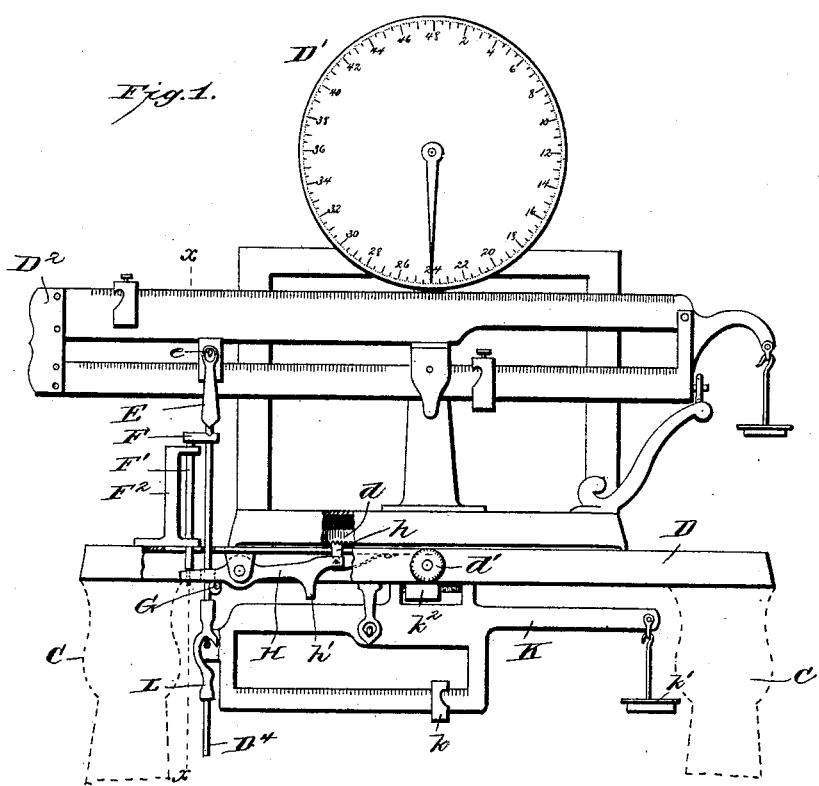
Figure 3:
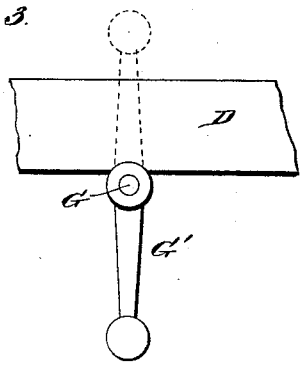
Figure 2:
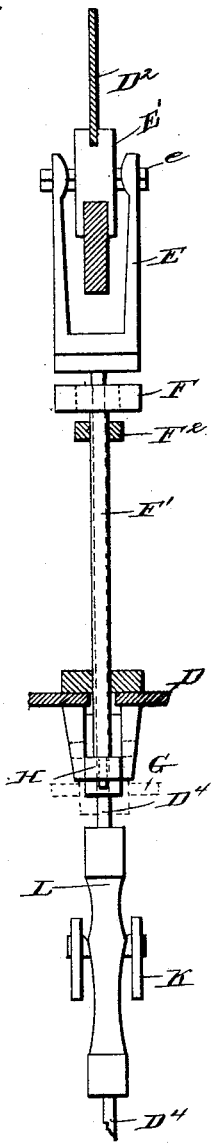
Figure 4:
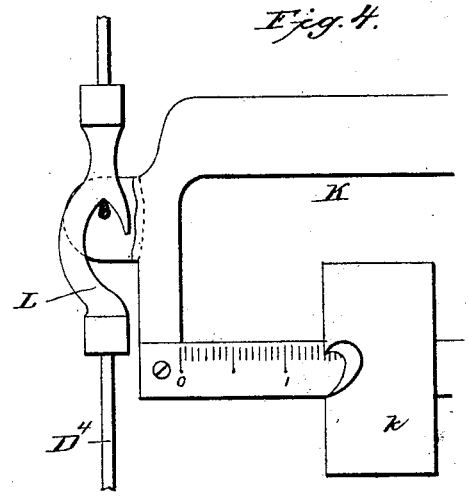
Figure 5:
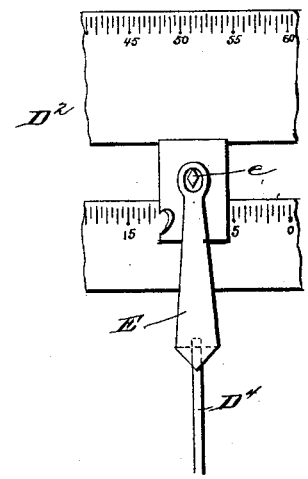

In the accompanying drawings, Figure 1 is a front elevation of a scale having the present invention applied thereto, with portions of the frame broken away to show details of construction. Fig. 2 is a section on the line $x\ x$, Fig. 1. Fig. 3 is a front elevation of the cam-shaft and handle. Fig. 4 is a detail elevation, on an enlarged scale, of the connection between the counter-beam and connecting-rod. Fig. 5 is a similar view of the connection between the computing-beam and connecting-rod.

Similar letters of reference in the several figures indicate the same parts.

The platform upon which the scoop or articles to be weighed are placed and the pillars C and supplemental base D are of ordinary construction and need no further description. This is also true of the levers and beams beneath the platform and the connecting-rod $D^4$ extending from the same up to the scale-beams.

Above the supplemental base D is located the units-dial $D'$ and computing scale-beams $D^2$, the latter being movable longitudinally of the supplemental base by means of a rack-bar $d$, hand-wheel, and pinion $d'$, all as in the application before mentioned. The upper end of the connecting-rod $D^4$ extends through the supplemental base and terminates in a yoke E, having suitable bearings at the top, through which project the knife-edge bearings $e$ in the block $E'$, which forms the attachment between the computing scale-beams and the connecting-rod. The scale-beams are adapted to slide through this block to vary the position of the fulcrum and change the unit of price, as will be readily understood by any one familiar with this class of scales, and in order to hold the block stationary the lower portion of the yoke E on each side of the connecting-rod is formed into a V-shaped or knife-edge bearing with which co-operate the correspondingly-shaped bearings on the vertically-movable stop-rest F, mounted on the upper end of the rod $F'$, held in widely-separated bearings in the bracket $F^2$, rigidly mounted on the supplemental base. With this construction when the stop-rest is elevated the weight of the connecting-rod and platform, with whatever is upon the same, is transferred from the computing-beam to the stop-rest and the block E is held absolutely stationary while the fulcrum and computing-beam are being shifted.

The rod and stop-rest are preferably elevated by means of a cam-shaft G and handle $G'$, which act on the lower end of the said rod through the medium of the lever H, pivoted within the supplemental base in any suitable manner. The end of the said lever opposite that which co-operates with the vertically-movable rod carries a toothed member $h$, which is adapted to co-operate with the rack $d$ on the under side of the movable base and lock the said base and fulcrum whenever the lever is released and the stop-rest lowered. Besides the toothed member, the lever is also provided with a downward extension

$h'$, which is adapted to co-operate with the weighing and tare beams to be now described. These beams (lettered K in the drawings) are pivoted to a hanger on the supplemental base and carry the weight $k$ on the graduated beam and the pendent $k'$ for the addition of supplemental pound-weights. At the right of the fulcrum the beams also carry the tare-weight $k^2$, used principally to balance the scoop or other receptacle placed on the platform for the reception of the goods to be weighed.

The connecting-rod $D^4$ is provided at a point opposite the counter or weighing beams with a coupling L, having a curved recess or opening forming a bearing in the direct line of the rod, and the counter-beams have a knife-edge bearing which engages and rests in this bearing at the point mentioned. The recess is large enough to permit the bearings to be entirely separated, which is desirable when the computing-beams are being moved.

As before mentioned, the lever H is provided with a downward extension $h'$, and when the lever is moved to elevate the connecting-rod this extension comes in contact with the counter-beams and depresses the power end of the same, thereby separating the bearings just mentioned.

The arrangement of the lever H is such, it will be seen from the foregoing, that a movement in one direction throws the connection between the rod and both beams out and locks the rod rigidly in position, at the same time releasing the movable base to permit its movement in either direction, while the reverse movement of the lever releases the rod and permits the beams to connect therewith and locks the movable base rigidly in position at all times when the scale is in condition for weighing. This construction relieves the bearing of the weight-beam K during the time the scale-beam is being shifted, and further aids in preventing any possible communication of motion from the rod to the price-beam due to the shaking of the platform or the addition of weight thereto. Further than this, the scales may be left when not in use with the bearings on both beams entirely relieved from strain or danger of becoming worn and corroded by long contact without being used.

At any time when the computing-beam is in balance, no matter what the location of the fulcrum, the counter-beam is in condition for weighing by the pound, &c. Hence it is unnecessary to readjust the computing-beams, as has almost universally been necessary with scales previously made.

What is claimed as new is—

1. In a price and weighing scale, the combination, with the movable computing-beam and connecting-rod loosely connected therewith, of the knife-edge bearing on the connecting-rod and the stop-rest engaging said knife-edge bearing to position and hold the rod stationary while the computing-beam is being shifted, substantially as described.

2. In a price and weighing scale, the combination, with the movable computing-beam and connecting-rod loosely connected therewith, of the knife-edge bearings on the connecting-rod and the vertically-movable stop-rest having the substantially-V-shaped bearings into which said knife-edge bearings pass to hold the rod stationary while the computing-beam is being shifted, substantially as described.

3. In a price and weighing scale, the combination, with the computing-beam and connecting-rod loosely connected therewith, of a movable stop-rest engaging said rod to release the connection between the same and the beam and hold the rod stationary while the beam is being shifted, substantially as described.

4. In a price and weighing scale, the combination, with the computing-beam and connecting-rod loosely connected therewith, of a vertically-movable stop-rest mounted in fixed bearings and engaging said rod to elevate the same and release the connection between the rod and beam, substantially as described.

5. In a price and weighing scale, the combination, with the longitudinally-movable computing-beam and connecting-rod loosely connected therewith, of a movable stop-rest for holding the rod while the beam is being shifted and a movable lock for the beam when the rod is released and the scale in adjustment for use, substantially as described.

6. In a price and weighing scale, the combination, with the movable computing-beam and connecting-rod loosely connected therewith, of a movable stop-rest engaging said rod to hold the same stationary, a lever for operating said stop-rest, and a lock for the beam also operated by the lever, whereby the beam is locked when the rod is released, and vice versa, substantially as described.

7. In a price and weighing scale, the combination, with the supplemental base, movable base, rack-bar thereon, pinion for moving the base, and computing-beam mounted on the base, of the connecting-rod, the stop-rest having a bearing engaging said rod, the pivoted lever engaging the stop-rest, and the lock on the lever adapted to engage the rack-bar when the stop-rest is out of operative position, substantially as described.

8. In a price and weighing scale, the combination, with the shifting, computing, or price beam and the weighing-beam having a fixed fulcrum, of connections between each of said beams and the platform, substantially as described.

9. In a price and weighing scale, the combination, with the computing-beam having a shifting fulcrum and the connecting-rod loosely connected to said beam, of the independent weight or counter beam having a fixed fulcrum and an independent connection with the said rod, substantially as described.

10. In a price and weighing scale, the combination, with the computing-beam having a shifting fulcrum and the connecting-rod loosely connected therewith, of the independent weight or counter beam having a knife-edge bearing and a bearing on the rod independent of the connection between the computing-beam and rod with which the knife-edge bearing engages, substantially as described.

11. In a price and weighing scale, the combination, with the computing-beam, connecting-rod loosely connected therewith, and the coupling in the connecting-rod having the bearing in the center line of the rod, of the independent weight or counter beam having the knife-edge bearing engaging said bearing, substantially as described.

12. In a price and weighing scale, the combination, with the computing-beam, independent weighing or counter beam, and connecting-rod loosely connected to both said beams, of the lever for releasing both said connections, substantially as described.

13. In a price and weighing scale, the combination, with the computing-beam, independent weighing or counter beam, and connecting-rod loosely connected to both said beams, of the stop-rest engaging the rod to hold the same stationary and release the connection with the computing-beam and the lever engaging said stop-rest to operate the same, having the projection engaging the weight or counter beam to release the connection between the same and connecting-rod, substantially as described.

14. In a price and weighing scale, the combination, with the shifting computing-beam, weighing or counter beam, and connecting-rod loosely connected with both said beams, of the lever for releasing said connections and the cam-shaft and handle for operating said lever, substantially as described.

WILLIAM H. SANDERSON.
ORANGE O. OZIAS.

Witnesses:
J. C. PATTERSON,
E. CANBY.

It is hereby certified that Letters Patent No. 451,075, granted April 28, 1891, upon the application of William H. Sanderson and Orange O. Ozias, of Dayton, Ohio, for an improvement in "Weighing and Price Scales," was erroneously issued to said Sanderson, Ozias, and Edward Canby, as joint owners of the patent, whereas the said Letters Patent should have been issued to said *Orange O. Ozias and Edward Canby* as sole owners of the invention, said Ozias and Canby being assignees of the entire interest of said Sanderson as shown by the record of assignments in the Patent Office; and that the said Letters Patent should be read with this correction therein that the same may conform to the record of the case in the Patent Office.

Signed, countersigned, and sealed this 15th day of September, A. D. 1891.

[SEAL.]

CYRUS BUSSEY,
*Assistant Secretary of the Interior.*

Countersigned:
   W. E. SIMONDS,
      *Commissioner of Patents.*